US012624761B2

(12) United States Patent
Kim

(10) Patent No.: US 12,624,761 B2
(45) Date of Patent: May 12, 2026

(54) SEAL FOR HIGH PRESSURE WATER JETS

(71) Applicant: BC TAECHANG INDUSTRIAL CORP., Gimhae-si (KR)

(72) Inventor: Do Hyoung Kim, Gimhae-si (KR)

(73) Assignee: BC TAECHANG INDUSTRIAL CORP. (KR)

( * ) Notice: Subject to any disclaimer, the term of this patent is extended or adjusted under 35 U.S.C. 154(b) by 319 days.

(21) Appl. No.: 17/857,359

(22) Filed: Jul. 5, 2022

(65) Prior Publication Data

US 2023/0265924 A1 Aug. 24, 2023

(30) Foreign Application Priority Data

Feb. 18, 2022 (KR) ......................... 10-2022-0021422

(51) Int. Cl.
 *F16J 15/16* (2006.01)
 *B05B 3/06* (2006.01)
(52) U.S. Cl.
 CPC .............. *F16J 15/166* (2013.01); *B05B 3/06* (2013.01)
(58) Field of Classification Search
 CPC . B05B 3/026; B05B 3/06; F16J 15/164; F16J 15/166; F16J 15/46

USPC .......................................................... 239/259
See application file for complete search history.

(56) References Cited

U.S. PATENT DOCUMENTS 2,652,228 A * 9/1953 Merrick .................. F03B 11/06
239/259
2017/0314683 A1* 11/2017 Nolte ..................... F16J 15/164

* cited by examiner

*Primary Examiner* — Christopher S Kim
(74) *Attorney, Agent, or Firm* — Park & Associates IP Law Office

(57) ABSTRACT

Proposed is a seal for a pressurized water jet apparatus which includes a housing, a connector through which pressurized water is introduced, a rotary body exposed in a direction in which the pressurized water inside the housing is discharged, a rotary support for supporting the rotary body, a nozzle connected to an end of the rotary body, a shaft, a bushing, and a seal coupled to the outer circumferential surface of the shaft and having a surface in contact with the bushing, wherein the seal includes an outer seal provided with a through hole having a tapered portion inclined so that the inner diameter thereof is expanded in the direction in which the pressurized water is discharged, and an inner seal inserted in the tapered portion of the outer seal and having the same inner diameter as that of the through hole of the outer seal.

7 Claims, 7 Drawing Sheets

<u>900</u>

SEAL FOR HIGH PRESSURE WATER JETS

REFERENCE TO RELATED APPLICATIONS

This application claims the priority benefit of Korean Patent Application No. 10-2022-0021422 filed on Feb. 18, 2022, the entire contents of which are incorporated herein by reference.

FIELD OF THE INVENTION

The present disclosure relates to a seal for high pressure water jets and, more particularly, to a technology that can improve durability of a seal for high pressure water jets by preventing deformation caused by high pressure water by constructing a double seal.

BACKGROUND OF THE INVENTION

A high pressure water jet is a device that can remove aged paint or corrosives from metal surfaces by spraying water with high pressure.

As a related art, Korean Utility Model Registration No. 20-0290119 "HIGH PRESSURE WATER INJECTION DEVICE FOR PUMP" is disclosed. FIG. 1 is a view showing a conventional high pressure water injection device for a pump. Referring to the drawing, provided is a high pressure water injection device for a pump in which a hose connector 2 is screwed into a housing 1 to which a metal ring 15 is fixed with a cap nut 3, and inside the housing 1, a hole shaft 4 is affixed by bearings 6 and 6', but between the bearings 6 and 6', a permanent magnet 7 is fixed in close contact with the inner surface of the housing 1 by a bushing 8 while maintaining the gap with a jaw 401 of the hole shaft 4 by a spacing ring 9, and at the inlet of the hole shaft 4, a seal 11 and a bushing 12 are fixed with a screw 13 to prevent the hole shaft 4 from falling out and adhere to a guide pipe 10 fixed to the hose connector 2, and in a nozzle head 5 fixed to the end of the hole shaft 4, several injection holes 5A are formed in a circular shape, and a nozzle 14 is fixed so that the nozzle head 5 may be rotated by the injection pressure.

At this time, the high pressure water is injected through the hole shaft 4 rotating along the guide pipe 10, and since the high pressure water flows inside the hole shaft 4, the seal 11 is compressed to the opposite side under strong pressure. There is a problem that the continuously compressed seal 11 is pushed into the inside of the bushing 12 at a portion in contact with the bushing 12 and is damaged.

DOCUMENTS OF RELATED ART

Patent Documents (Patent Document 0001) KR 20-0290119 Y1.

SUMMARY OF THE INVENTION

Accordingly, the present disclosure has been made keeping in mind the above problems occurring in the related art, and the present disclosure is intended to provide a seal for high pressure water jets, which can avoid deformation as much as possible to be protected even when the seal is pressured by high pressure water.

In order to achieve the above objective, according to an embodiment of the present disclosure, there is provided a seal for high pressure water jets, the high pressure water jets each including: a housing; an inlet unit coupled to an inside of the housing on a first side thereof, and into which high pressure water is introduced; a rotary unit mounted inside the housing and exposed in a direction in which the high pressure water inside the housing is discharged; a discharge unit connected to an end of a rotary body of the rotary unit; and a seal provided between the inlet unit and the rotary body inside the rotary unit, wherein the seal includes: an outer seal in which a through hole having a tapered portion inclined so that an inner diameter is expanded in the direction in which the high pressure water is discharged is formed; and an inner seal inserted in the tapered portion of the outer seal and having a same inner diameter as that of the through hole.

An outer side of the inner seal may be formed to be tapered to correspond to a shape of the tapered portion, so that the inner seal is pressed along an inclined surface of the outer seal to prevent compression deformation of the outer seal as pressure of the discharged high pressure water acts on first ends of the outer seal and the inner seal.

The inner seal may be made of a harder material than that of the outer seal.

A protrusion may be formed on the tapered portion of the outer seal to prevent the pressurized and inserted inner seal from escaping to the outside.

An O-ring may be formed on an outer peripheral surface of the outer seal.

As described above, the seal for high pressure water jets of the present disclosure has a following effect.

Since the seal is constructed as a double seal, when the pressure of high pressure water is applied, an inner seal located inside an outer seal is pressed along a tapered portion, so that compression deformation of the outer seal can be prevented as much as possible.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, an embodiment of the present disclosure will be described in detail with reference to the accompanying drawings. Since the following description and the accompanying drawings are presented for a general understanding of the present disclosure, the technical scope of the present disclosure is not limited thereto. In addition, detailed descriptions of well-known structures and functions that may unnecessarily obscure the gist of the present disclosure will be omitted.

As used in this disclosure, the term "proximal" refers to a portion of a component or structure that is relatively closer to a reference point, such as the user, operator, or base of the device, while "distal" refers to a portion that is relatively farther from that reference point. These terms are used to describe spatial relationships between elements and are intended to be understood in the context of the overall structure and function of the invention as disclosed.

Figure 1:
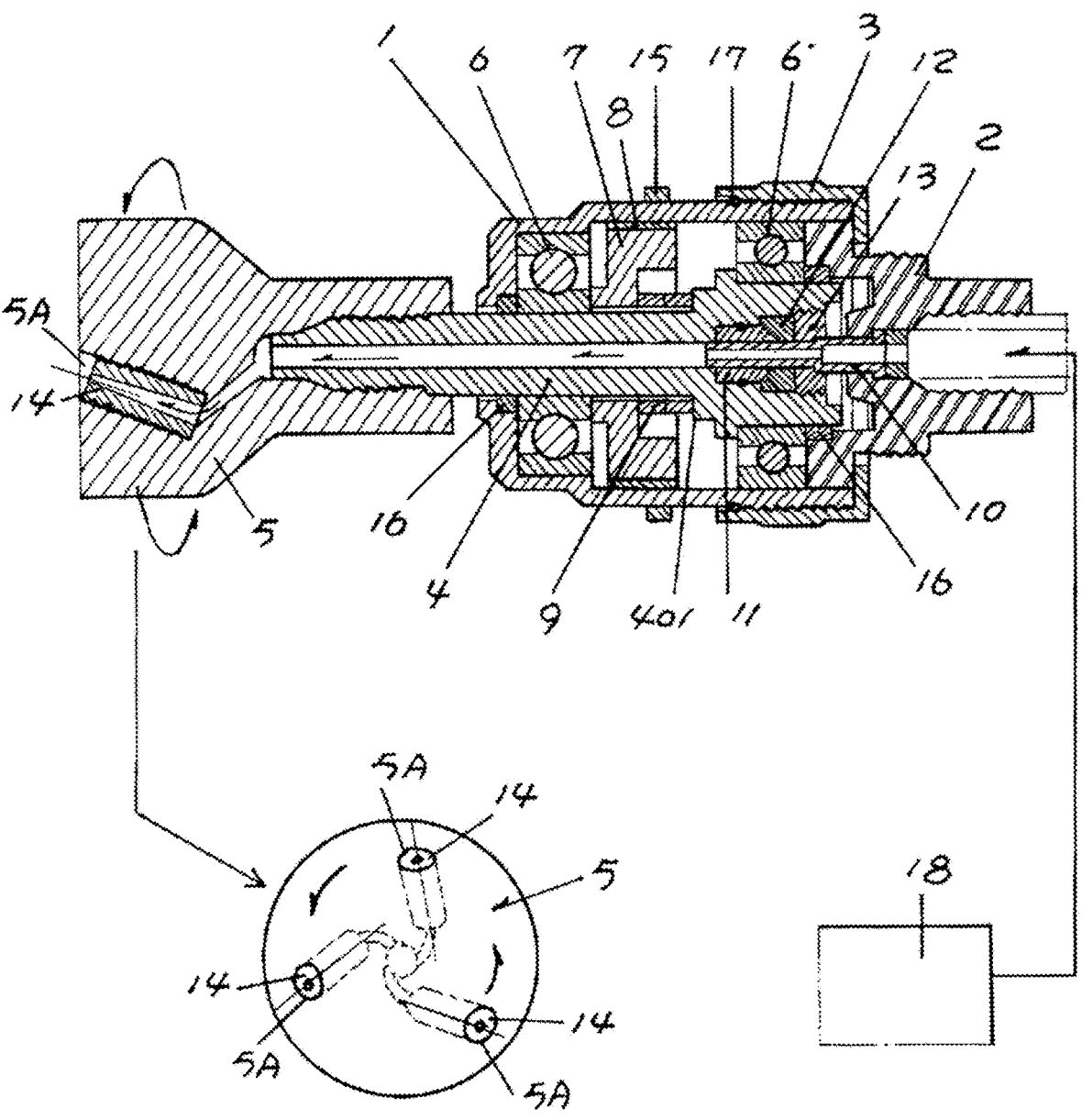
FIG. 1 is a cross-sectional view of a conventional high pressure water jet.
Figure 2:
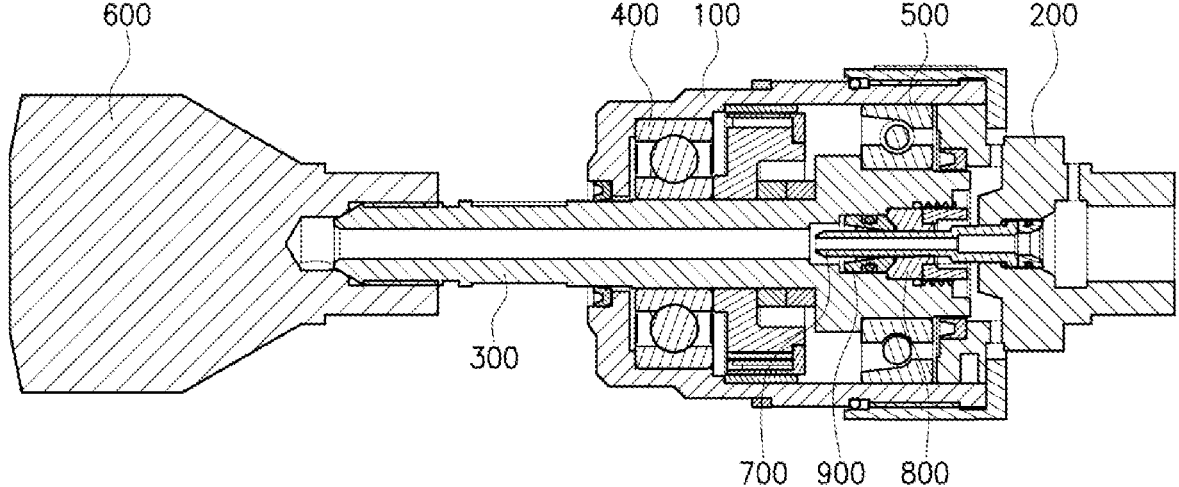
FIG. 2 is a cross-sectional view of a high pressure water jet of the present disclosure.

FIG. 2 is a cross-sectional view of a high pressure water jet of the present disclosure.

Referring to FIG. 2, the high pressure water jet includes a housing 100, an inlet unit, a rotary unit, a discharge unit, and a seal.

To be specific, the inlet unit is coupled to one side of the housing 100 so that a connector 200 through which high pressure water is introduced is connected.

The rotary unit is mounted inside the housing 100 and rotated, is partially exposed in the direction in which the high pressure water inside the housing 100 is discharged, and includes: a rotary body 300 in which a flow path through which high pressure water passes is formed; and rotary supports 400 and 500 coupled to the inside of the housing 100 to support the rotary body 300. The rotary supports 400 and 500 may be viewed as bearings.

The discharge unit is a nozzle 600 that is connected to the end of the rotary body 300 and injects high pressure water.

In addition, a shaft 700 provided inside the rotary body 300 and connected to the connector 200 may be further provided.

A bushing 800 coupled to the outer circumferential surface of the shaft 700, and a seal 900 coupled to the outer circumferential surface of the shaft 700 and in close contact with the bushing 800 are included.

Figure 3:
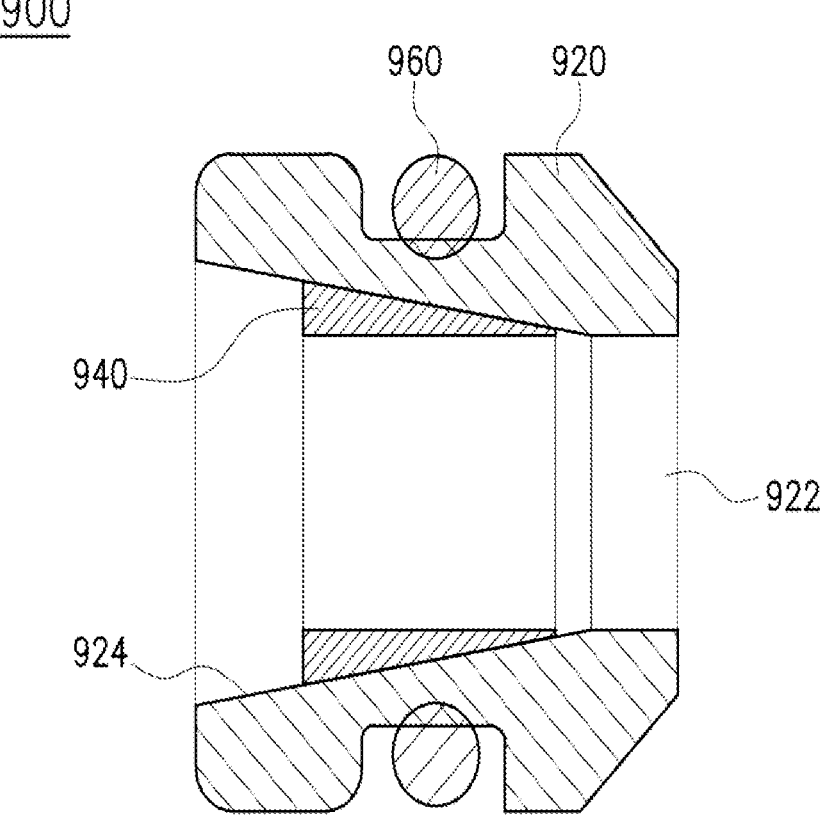
FIG. 3 is a cross-sectional view of a seal for high pressure water jets according to an embodiment of the present disclosure.

FIG. 3 is a cross-sectional view of a seal for high pressure water jets according to an embodiment of the present disclosure.

The seal 900 is formed with a through hole coupled to the outer circumferential surface of the shaft 700, and is dually composed of an outer seal 920 and an inner seal 940. The outer seal 920 and the inner seal 940 are configured separately, and the inner seal 940 is inserted in the outer seal 920 and combined.

The outer seal 920 is provided with a through hole 922, and in the through hole 922, a tapered portion 924 inclined to gradually expand toward the end of the shaft 700 is formed.

In addition, an O-ring 960 is formed on the outer peripheral surface of the outer seal 920. The O-ring 960 may seal between the shaft and the seal 900.

The inner seal 940 is inserted in the tapered portion 924 of the outer seal 920 and has an inner diameter of the same size as that of the through hole 922.

Here, the outer side of the inner seal 940 is tapered to correspond to the shape of the tapered portion 924.

Figure 4:
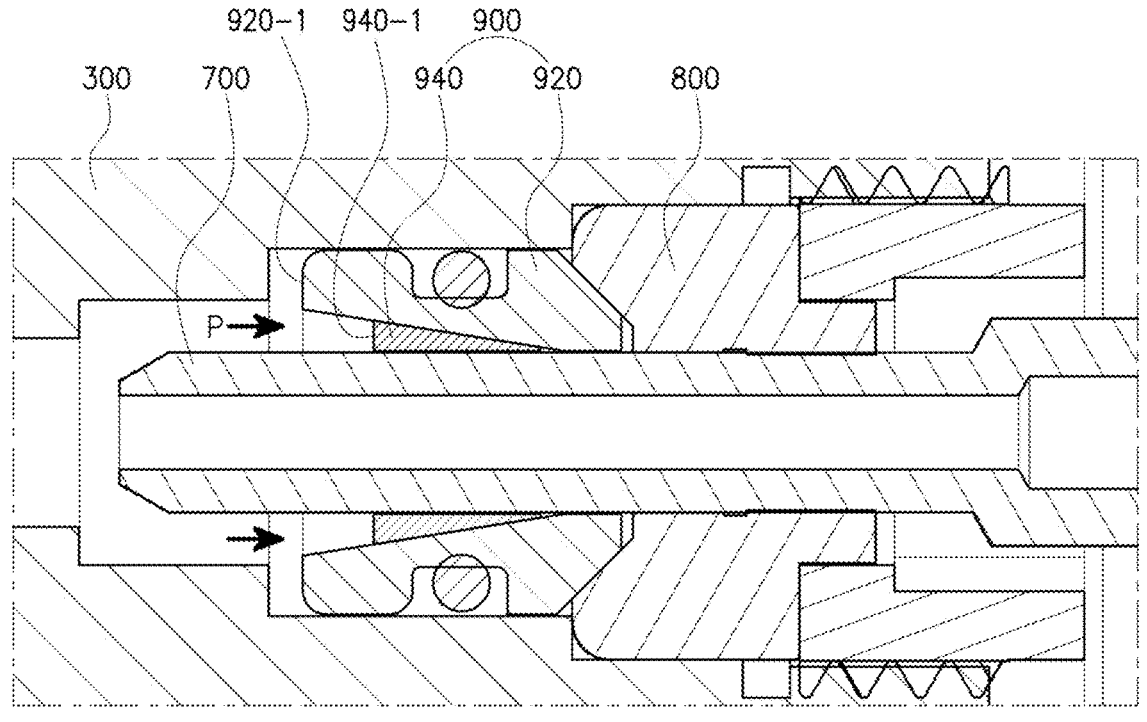
FIG. 4 is an enlarged view of the main part of the seal for high pressure water jets according to the embodiment of the present disclosure.

FIG. 4 is an enlarged view of the main part of the seal for high pressure water jets according to the embodiment of the present disclosure.

Referring to FIG. 4, the present disclosure is characterized in that compression deformation of the outer seal 920 is prevented since pressure of the high pressure water discharged from the shaft 700 acts on the ends of the outer seal 920 and the inner seal 940, and the inner seal 940 is pressed along an inclined surface of the outer seal 920.

In other words, the present disclosure is configured to prevent the outer seal 920 from being damaged by being pushed into the inner gap between the shaft 700 and the bushing 800 under the pressure of high pressure water.

Meanwhile, the inner seal 940 is characterized in that the inner seal 940 is made of a material harder than that of the outer seal 920, and thus, even when the inner seal 940 and the outer seal 920 are pressurized with the same pressure, it is possible to prevent the outer seal 920 from being compressed and deformed in the inner diameter direction of the inner seal 940.

Figure 5:
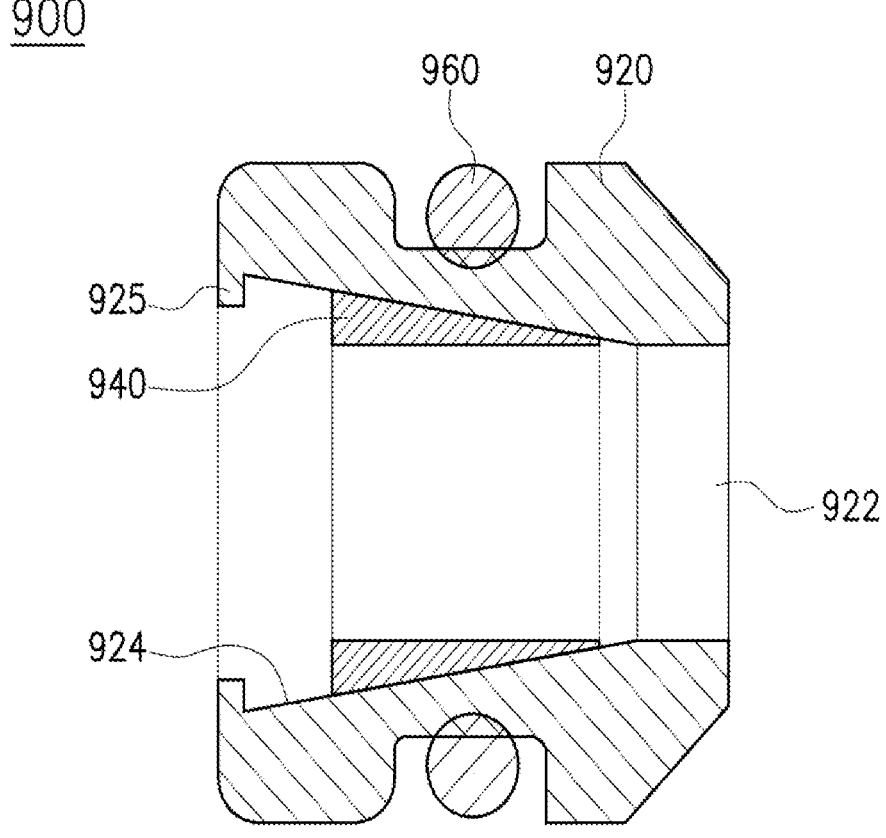
FIG. 5 is another exemplary view of the seal for high pressure water jets according to the embodiment of the present disclosure.

FIG. 5 is another exemplary view of the seal for high pressure water jets according to the embodiment of the present disclosure.

In addition, a protrusion 925 is formed on the tapered portion of the outer seal 920 to prevent the pressurized and inserted inner seal 940 from escaping to the outside.

Figure 6:
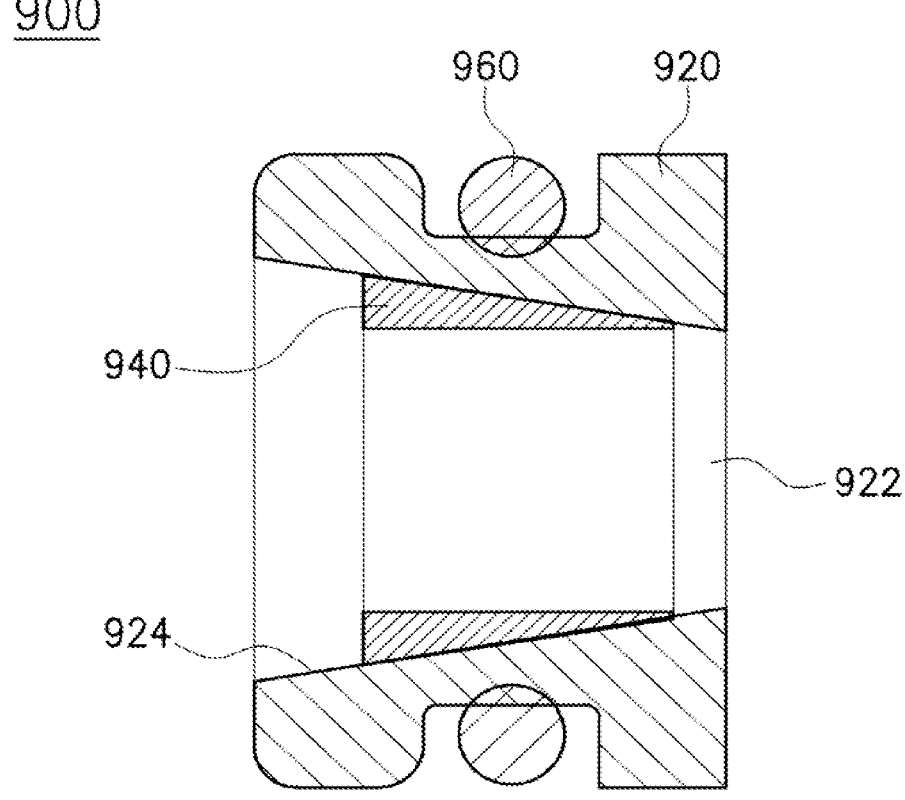
FIG. 6 is yet another exemplary view of the seal for high pressure water jets according to the embodiment of the present disclosure.

FIG. 6 is yet another exemplary view of the seal for high pressure water jets according to the embodiment of the present disclosure.

Referring to FIG. 6, the outer seal 920 of the seal 900 is formed such that the tapered portion 924 is directly connected from the through hole 922, and the outer shape of the outer seal 920 is changed. Of course, as described above, the shape of the seal 900 may be variously changed according to an internal mounting state.

Figure 7:
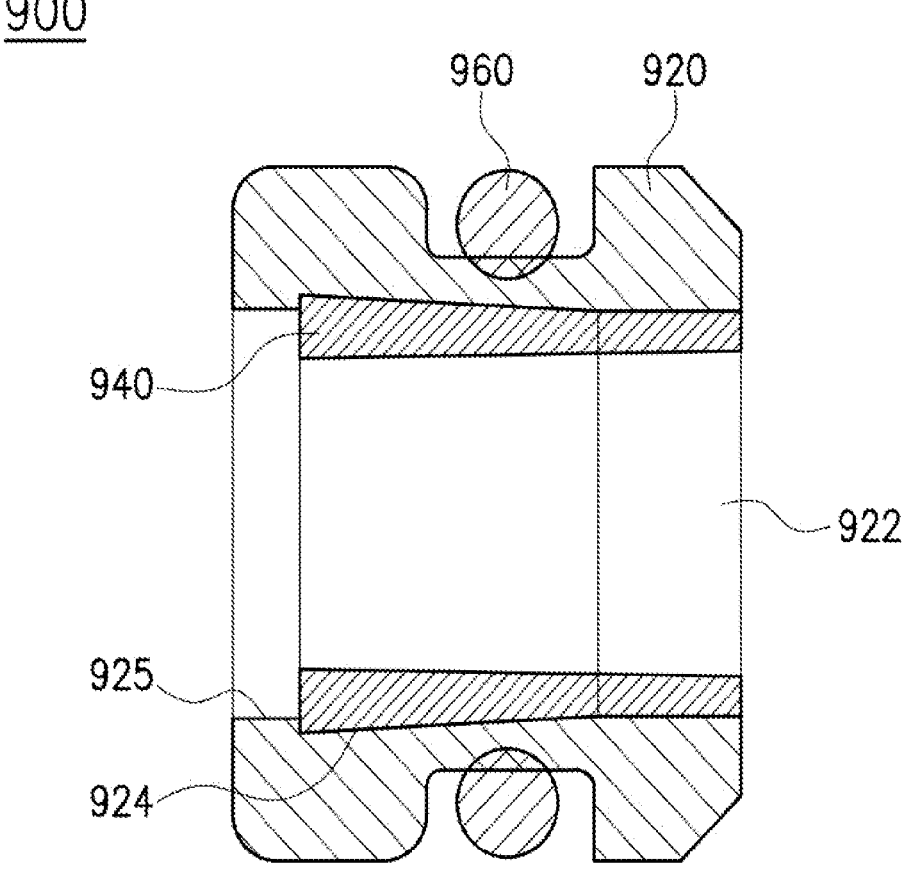
FIG. 7 is yet another exemplary view of the seal for high pressure water jets according to the embodiment of the present disclosure.

FIG. 7 is yet another exemplary view of the seal for high pressure water jets according to the embodiment of the present disclosure.

Referring to FIG. 7, the inner seal 940 is formed to extend to be in close contact with the insides of the tapered portion and the through hole except for the protrusion within the outer seal.

As described above, it can be seen that the present disclosure is a basic technical idea of a seal for high pressure water jets, and thus, within the scope of the basic idea of the present disclosure, many other modifications are possible for those of ordinary skill in the art.

What is claimed is:

1. A seal for a pressurized water jet apparatus utilizing a pressurized water stream provided therein, wherein the pressurized water jet apparatus includes an inner shaft, and a rotary body rotatably coupled to the inner shaft, wherein the seal comprises:

an outer seal of generally tubular shape, the outer seal including an axially-extending through hole containing a tapered hole portion therein such that an inner diameter of the tapered hole portion is expanded in a direction in which the pressurized water stream inside the pressurized water jet apparatus is to be discharged; and an inner seal inserted in the tapered hole portion of the outer seal and having an inner diameter allowing the inner shaft of the pressurized water jet apparatus to be snugly inserted thereto, wherein an outer surface of the inner seal is tapered to correspond to a shape of the tapered hole portion of the outer seal, so that the inner seal is pressed along a tapered surface of the outer seal to limit a compression deformation of the outer seal as a hydraulic pressure of the pressurized water acts on distal end surfaces, located farther from an operator of the pressurized water jet apparatus, of the outer seal and the inner seal.

2. The seal for a pressurized water jet apparatus of claim 1, wherein the inner seal is made of a harder material than that of the outer seal.

3. The seal for a pressurized water jet apparatus of claim 1, wherein a protrusion is formed on a distal side, located farther from the operator of the pressurized water jet apparatus, of the tapered hole portion of the outer seal to prevent the inserted inner seal from escaping to an outside.

4. The seal for a pressurized water jet apparatus of claim 3, wherein the inner seal is placed at a proximal side, located nearer to the operator of the pressurized water jet apparatus of the tapered hole portion and a distal end, located farther from the operator of the pressurized water jet apparatus, of the inner seal is displaced from the protrusion of the outer seal.

5. The seal for a pressurized water jet apparatus of claim 1, wherein an O-ring is provided on an outer peripheral surface of the outer seal.

6. The seal for a pressurized water jet apparatus of claim 1, wherein the tapered hole portion is provided throughout an entire length of the through hole of the outer seal, and the inner seal is placed at a proximal side, located nearer to the operator of the pressurized water jet apparatus, of the tapered hole portion.

7. The seal for a pressurized water jet apparatus of claim 1, wherein a protrusion is formed on a distal end, located farther from the operator of the pressurized water jet apparatus, of the tapered hole portion of the outer seal to prevent the inserted inner seal from escaping to an outside, wherein the through hole of the outer seal further includes a non-tapered cylindrical hole portion coaxially extending from a proximal end, located nearer to the operator of the pressurized water jet apparatus, of the tapered hole portion of the outer seal, wherein the inner seal has the outer surface exactly matching to the tapered hole portion and the non-tapered cylindrical hole portion of the outer seal while the inner seal being abutted against the protrusion of the outer seal.

* * * * *